United States Patent
Ren et al.

(10) Patent No.: US 11,206,684 B2
(45) Date of Patent: Dec. 21, 2021

(54) METHOD AND DEVICE FOR SENDING AND RECEIVING PREAMBLE SEQUENCE OF PHYSICAL RANDOM ACCESS CHANNEL

(71) Applicant: CHINA ACADEMY OF TELECOMMUNICATIONS TECHNOLOGY, Beijing (CN)

(72) Inventors: Bin Ren, Beijing (CN); Ren Da, Beijing (CN); Fang-Chen Cheng, Beijing (CN); Ekpenyong Tony, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/496,949

(22) PCT Filed: Mar. 15, 2018

(86) PCT No.: PCT/CN2018/079176
§ 371 (c)(1),
(2) Date: Sep. 23, 2019

(87) PCT Pub. No.: WO2018/171507
PCT Pub. Date: Sep. 27, 2018

(65) Prior Publication Data
US 2020/0383139 A1     Dec. 3, 2020

(30) Foreign Application Priority Data
Mar. 22, 2017   (CN) .......................... 201710174338.2

(51) Int. Cl.
*H04W 74/00* (2009.01)
*H04W 74/08* (2009.01)
(Continued)

(52) U.S. Cl.
CPC ....... *H04W 74/008* (2013.01); *H04J 13/0062* (2013.01); *H04L 27/2607* (2013.01); *H04W 72/0466* (2013.01); *H04W 74/0833* (2013.01)

(58) Field of Classification Search
None
See application file for complete search history.

(56) References Cited

U.S. PATENT DOCUMENTS 10,512,107 B2 * 12/2019 Sung ................. H04W 74/0833
10,959,273 B2 *  3/2021 Lei ....................... H04L 27/2607
(Continued)

FOREIGN PATENT DOCUMENTS

CN       101345577 A      1/2009
CN       102271418 A     12/2011
(Continued)

OTHER PUBLICATIONS

Huawei, HiSilicon, "RACH preamble design for NR", 3GPP TSG RAN WG1 Meeting #88, R1-1701709, Athens, Greece, Feb. 13-17, 2017.
(Continued)

*Primary Examiner* — Steve R Young
(74) *Attorney, Agent, or Firm* — Kilpatrick Townsend & Stockton, LLP (57) ABSTRACT

A method and device for sending and receiving a preamble sequence of a physical random access channel, comprising: scrambling a preamble subsequence and then sending, the preamble subsequence being scrambled according to a cyclic shift value of a preamble subsequence sent in the previous stage; performing a descrambling operation according to a cyclic shift value of a preamble subsequence received in the previous stage during reception; and determining a preamble sub-sequence detected after descrambling as a preamble sub-sequence received in the current
(Continued)

stage, where the received preamble sub-sequence in the current stage and the received preamble sub-sequence in the previous stage belong to the same preamble sequence.

8 Claims, 3 Drawing Sheets

(51) Int. Cl.
    *H04W 72/04* (2009.01)
    *H04L 27/26* (2006.01)
    *H04J 13/00* (2011.01)

(56) References Cited

U.S. PATENT DOCUMENTS

| | | | | |
|---|---|---|---|---|
| 2011/0064069 | A1* | 3/2011 | Lipka | H04J 13/0003 370/344 |
| 2011/0150156 | A1* | 6/2011 | Xue | H04J 13/0062 375/354 |
| 2012/0052855 | A1 | 3/2012 | Soliman et al. | |
| 2017/0078998 | A1* | 3/2017 | Li | H04L 27/261 |
| 2018/0124830 | A1* | 5/2018 | Lin | H04W 8/005 |
| 2019/0159262 | A1* | 5/2019 | Wang | H04W 72/0446 |
| 2019/0373642 | A1* | 12/2019 | Suzuki | H04W 74/0833 |
| 2020/0015282 | A1* | 1/2020 | Zhao | H04W 72/044 |

FOREIGN PATENT DOCUMENTS

| | | |
|---|---|---|
| CN | 105376009 A | 3/2016 |
| WO | 2011109466 A | 9/2011 |

OTHER PUBLICATIONS

CATT, "On NR RACH Preamble Design", 3GPP TSG RAN WG1 Meeting #88bis, R1-1704540, Spokane, USA, Apr. 3-7, 2017.
CATT: "On NR RACH Preamble Design"; 3GPP TSG RAN WG1 Meeting #88; R1-1702065; Athens, Greece, Feb. 13-17, 2017.

\* cited by examiner

METHOD AND DEVICE FOR SENDING AND RECEIVING PREAMBLE SEQUENCE OF PHYSICAL RANDOM ACCESS CHANNEL

This application is a National Stage of International Application No. PCT/CN2018/079176, filed Mar. 15, 2018, which claims priority to Chinese Patent Application No. 201710174338.2, filed Mar. 22, 2017, both of which are hereby incorporated by reference in their entireties.

FIELD

The present invention relates to the field of wireless communications, and particularly to a method and device for receiving and transmitting a preamble sequence on physical random access channel.

BACKGROUND

In the study on a Next-generation Radio (NR) Physical Random Access Channel (PRACH) preamble sequence, in order to further improve the performance of detecting a preamble, and to lower the probability that short preamble sequences collide with each other, a multi-stage (M-stage) preamble sequence has been designed. An M-stage preamble sequence includes M number of preamble sub-sequences for Msg1 transmission in a random access. A User Equipment (UE) selects an M-stage preamble sequence from a preset or network-configured set of M-stage preamble sequences, and transmits the selected M-stage preamble sequence over a network-configured time-frequency resource. The network (a next-generation NodeB (gNB) or a Transmission and Reception Point (TRP)) detects the M number of preamble sub-sequences included in the M-stage preamble sequence respectively on the time-frequency resource. The M-stage preamble sequence can be detected correctly only if all of the M number of preamble sub-sequences are detected correctly.

Figure 1:
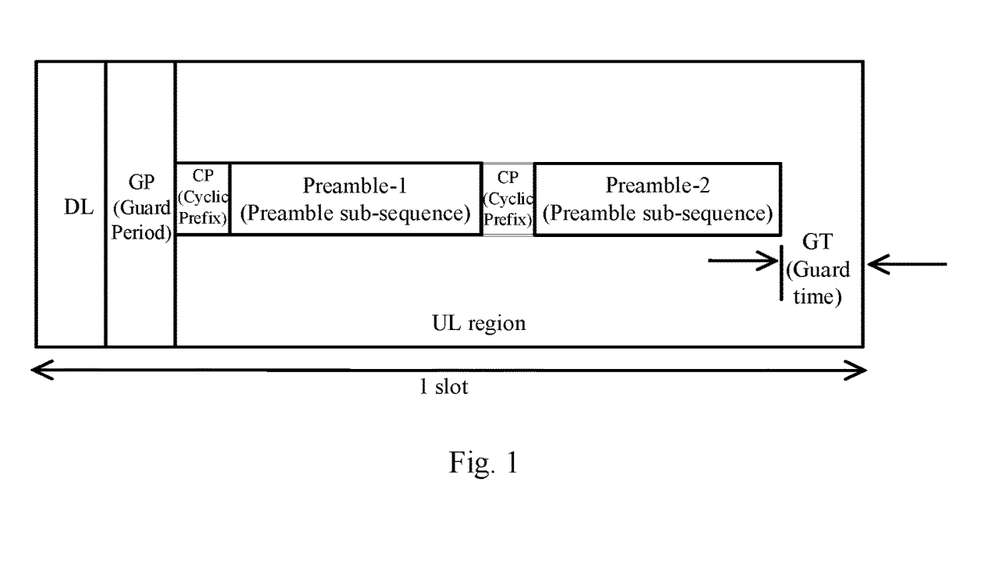
FIG. 1 is a schematic diagram of an example of the designed NR-PRACH M-stage preamble sequence in the related art, where M=2.

FIG. 1 is a schematic diagram of an example of a designed NR-PRACH M-stage preamble sequence, where M=2, that is, a 2-stage preamble sequence includes two preamble sub-sequences (Preamble-1 and Preamble-2 as illustrated). There are respective Cyclic Prefixes (CPs) of two consecutive preamble sub-sequences (Preamble-1 and Preamble-2), and a Guard Time (GT) interval is reserved at the tail of the 2-stage preamble sequence. The respective preamble sub-sequences are selected separately by the UE to compose the 2-stage preamble sequence, transmitted as Msg1, and detected respectively at the network side. The 2-stage preamble sequence can be detected correctly only if both of the preamble sub-sequences are detected correctly.

A Zadoff-Chu (ZC) sequence (simply a ZC root sequence) is used as a root sequence for a PRACH root sequence. Since 64 preamble sequences of each cell are generated by cyclically shifting (Ncs, i.e., zero-correlation configuration) the ZC root sequence, and the preamble sequence of a UE is selected randomly, or allocated by the gNB, so in order to alleviate the preamble sequences of the adjacent cells from interfering with each other, the indexes of ZC root sequences shall be planned correctly. The indexes of the ZC root sequences are planned by allocating them so that different preamble sequences are generated for the adjacent cells using the indexes to thereby avoid the adjacent cell with the same preamble sequence from interfering with each other.

A Zadoff-Chu (ZC) sequence with a root index $u^{th}$ is defined in the equation of:

$$X_u(n) = e^{-j\frac{\pi u n(n+1)}{N_{ZC}}}, 0 \leq n \leq N_{ZC} - 1. \quad (1)$$

$N_{ZC}$ represents the length of the ZC sequence, u represents the root index of the ZC sequence, j=sqrt(−1), and n represents the index of a sequence element.

A random access preamble is obtained by cyclically shifting the ZC sequence with the root index $u^{th}$ in the equation of:

$$X_{u,v}(n) = X_u((n+C_v) \bmod N_{ZC}) \quad (2).$$

$C_v$ represents a cyclic shift value, $C_v = vN_{cs}$, and v represents the v-th cyclic shift value Ncs in the range of $0, 1, \ldots, \lfloor N_{ZC}/N_{CS} \rfloor$, where $\lfloor \cdot \rfloor$ represents rounding off.

A drawback in the related art lies in that if a plurality of UEs transmit over the same time-frequency resource, a preamble sequence may be detected vaguely in the existing M-stage preamble sequence solution.

SUMMARY

Embodiments of the invention provide a method and device for receiving and transmitting a preamble sequence on physical random access channel, so as to address the problem in the related art that an M-stage preamble sequence of an NR PRACH may be detected vaguely among a plurality of UEs.

An embodiment of the invention provides a method for transmitting a preamble sequence on PRACH, the method including: determining a preamble sub-sequence to be transmitted in the current stage; and scrambling and then transmitting the preamble sub-sequence, where the preamble sub-sequence is scrambled using a cyclic shift value of a preamble sub-sequence transmitted in the previous stage.

In an implementation, upon scrambling the preamble sub-sequence in the current stage according to the cyclic shift value of the preamble sub-sequence transmitted in the previous stage, the cyclic shift value is a preamble sub-sequence index of the preamble sub-sequence transmitted in the previous stage, or the cyclic shift value is a value obtained as a result of linear mapping from the preamble sub-sequence index.

In an implementation, upon scrambling the preamble sub-sequence in the current stage according to the cyclic shift value of the preamble sub-sequence transmitted in the previous stage, a pseudo-random noise sequence is configured for scrambling.

An embodiment of the invention provides a method for receiving a preamble sequence on PRACH, the method including: determining a cyclic shift value of a preamble sub-sequence received in the previous stage; descrambling a preamble sub-sequence in a current stage using the cyclic shift value of the preamble sub-sequence received in the previous stage; and determining a preamble sub-sequence detected after descrambling as a preamble sub-sequence received in a current stage, where the received preamble sub-sequence in the current stage and the received preamble sub-sequence in the previous stage belong to the same preamble sequence.

In an implementation, upon descrambling the preamble sub-sequence in the current stage according to the cyclic shift value of the preamble sub-sequence received in the previous stage, the cyclic shift value is a preamble sub-sequence index of the preamble sub-sequence received in the previous stage, or the cyclic shift value is a value obtained as a result of linear mapping from the preamble sub-sequence index.

In an implementation, upon descrambling the preamble sub-sequence in the current stage according to the cyclic shift value of the preamble sub-sequence received in the previous stage, a pseudo-random noise sequence is configured for descrambling.

An embodiment of the invention provides a device for transmitting a preamble sequence on PRACH, comprising a processor and a transceiver, where the processor is configured to read and execute program in a memory to determine a preamble sub-sequence to be transmitted in a current stage; and the transceiver is configured to transmit and receive data under the control of the processor: to scramble and transmit the preamble sub-sequence, where the preamble sub-sequence is scrambled according to a cyclic shift value of a preamble sub-sequence transmitted in a previous stage.

In an implementation, upon scrambling the preamble sub-sequence in the current stage according to the cyclic shift value of the preamble sub-sequence transmitted in the previous stage, the cyclic shift value is a preamble sub-sequence index of the preamble sub-sequence transmitted in the previous stage, or the cyclic shift value is a value obtained as a result of linear mapping from the preamble sub-sequence index.

In an implementation, upon scrambling the preamble sub-sequence in the current stage according to the cyclic shift value of the preamble sub-sequence transmitted in the previous stage, a pseudo-random noise sequence is configured for scrambling.

An embodiment of the invention provides a device for receiving a preamble sequence on PRACH, comprising a processor and a transceiver, where: the processor is configured to read and execute program in a memory: to determine a cyclic shift value of a preamble sub-sequence received in a previous stage; to descramble a preamble sub-sequence in a current stage according to the cyclic shift value of the preamble sub-sequence received in the previous stage; and to determine a preamble sub-sequence received in the current stage after descrambling as a preamble sub-sequence detected in the current stage, where the received preamble sub-sequence in the current stage and the received preamble sub-sequence in the previous stage belong to the same preamble sequence; and the transceiver is configured to transmit and receive data under the control of the processor: to receive a preamble sub-sequence on PRACH.

In an implementation, upon descrambling the preamble sub-sequence in the current stage according to the cyclic shift value of the preamble sub-sequence received in the previous stage, the cyclic shift value is a preamble sub-sequence index of the preamble sub-sequence received in the previous stage, or the cyclic shift value is a value obtained as a result of linear mapping from the preamble sub-sequence index.

In an implementation, upon descrambling the preamble sub-sequence in the current stage according to the cyclic shift value of the preamble sub-sequence received in the previous stage, a pseudo-random noise sequence is configured for descrambling.

Advantageous effects of the invention are as follows.

In the technical solutions according to the embodiments of the invention, the transmitter scrambles and then transmits preamble sub-sequence using the cyclic shift value of the preamble sub-sequence received in the previous stage; and the receiver descrambles using the cyclic shift value of the preamble sub-sequence received in the previous stage, and determines a preamble sub-sequence detected after descrambling as a preamble sub-sequence received in a current stage, where the received preamble sub-sequence in the current stage and the received preamble sub-sequence in the previous stage belong to the same preamble sequence. Since the transmitter and the receiver scramble and descramble using the cyclic shift value of the preamble sub-sequence received in the previous stage, it can be determined accurately whether the respective preamble sub-sequences belong to the same preamble sequence, so such a problem in the related art that if a plurality of UEs transmit over the same time-frequency resource, a preamble sequence may not be detected accurately in the NR-PRACH M-stage preamble sequence solution, and the reliability and performance of the preamble sequence solution can be guaranteed in effect.

BRIEF DESCRIPTION OF THE DRAWINGS

The drawings described here are intended to provide further understanding of the invention, and constitute a part of the specification, and the exemplary embodiments of the invention; and the description thereof are intended to set forth the invention, but not to limit the invention unduly.

DETAILED DESCRIPTION OF THE EMBODIMENTS

In order to make the objects, technical solutions, and advantages of the embodiments of the invention more apparent, the technical solutions according to the embodiments of the invention will be described below clearly and fully with reference to the drawings in the embodiments of the invention. Some embodiments to be described below are only a part but not all of the embodiments of the invention. Based upon the embodiments here of the invention, all the other embodiments which can occur to those ordinarily skilled in the art without any inventive effort shall fall into the scope of the invention.

It shall be appreciated that the technical solutions according to the embodiments of the invention can be applicable to various communication systems, e.g., a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an Advanced long term evolution (LTE-A)

system, a Universal Mobile Telecommunication System (UMTS), New Radio (NR), etc.

It shall be further appreciated that in the embodiments of the invention, a User Equipment (UE) includes but will not be limited to a Mobile Station (MS), a mobile terminal, a mobile telephone, a handset, a portable equipment, etc. The user equipment can communicate with one or more core networks over a Radio Access Network (RAN). For example, the user equipment can be a mobile phone (referred to as a "cellular" phone), a computer with a function of radio communication, etc., and the user equipment can also be a portable, pocket, handheld, built-in-computer, or on-vehicle mobile device.

In the embodiments of the invention, a base station (e.g., an access point) can be such a device in an access network that communicates with a radio terminal over one or more sectors via an air interface. The base station can be configured to convert a received air frame into an IP packet, and a received IP packet into an air frame, and operate as a router between the radio terminal, and the remaining components of the access network, where the remaining components of the access network can include an Internet Protocol (IP) network. The base station can further coordinate attribute management on the air interface, and for example, the base station can be a Base Communication module Station (BTS) in a GSM or CDMA system, or can be a base station (Node B) in a TD-SCDMA or WCDMA system, or can be an evolved base station (eNode B or eNB or e-Node B) in an LTE system, or can be a base station (gNB) in a 5G NR system, although the invention will not be limited thereto.

A drawback in the related art lies in that if a plurality of UEs transmit over the same time-frequency resource, a preamble sequence may be detected vaguely in the existing M-stage preamble sequence solution. This will be described below taking M=2 as an example.

For example, two UEs in a system transmit 2-stage preamble sequences over a same time-frequency resource. The UE 1 selects a 2-stage preamble sequence (a, b), where a and b represent stage-1 and stage-2 preamble sub-sequences respectively. The UE 2 selects a 2-stage preamble sequence (c, d), where c and d represent stage-1 and stage-2 preamble sub-sequences respectively. The two preamble sub-sequences a and c will be detected by a network on the stage-1, and the two preamble sub-sequences b and d will be detected by the network on the stage-2. At this time, four possible 2-stage preamble sequences, i.e., (a, b), (a, d), (c, b), and (c, d) are generated. The network can not correctly determine the 2-stage preamble sequences really transmitted by the UE1 and the UE2 at this time, so the 2-stage preamble sequences of the UEs may not be detected accurately.

In view of this, the technical solutions according to the embodiments of the invention are intended to address the problem in the related art that an M-stage preamble sequence of an NR PRACH may not be detected accurately among a plurality of UEs. Particular implementations of the invention will be described below with reference to the drawings.

Implementations at a transmitter and a receiver will be described respectively in the following description, where a scrambling process in the transmitter, and a descrambling process in the receiver will be described, and then an implementation in which both of them cooperate will be further exemplified for better understanding of an implementation of the solution according to the embodiment of the invention. This shall not suggest that the transmitter and the receiver must operate in cooperation or separately in an implementation, but in fact, the respective problems at the transmitter and the receiver can be addressed when they operate separately, and a better technical effect can be achieved when both of them cooperate.

Figure 2:
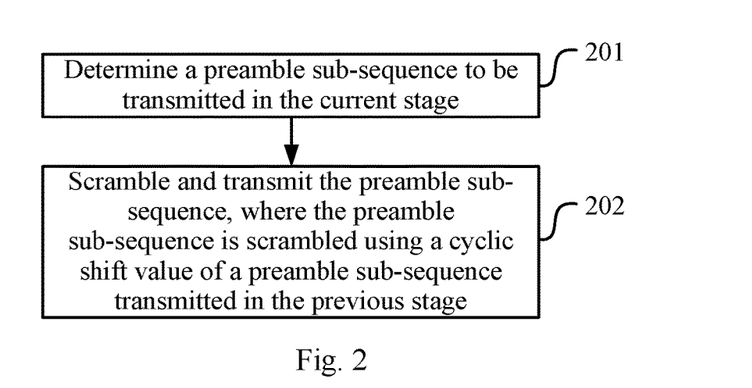
FIG. 2 is a schematic flow chart of a method for transmitting a preamble sequence on PRACH according to some embodiments of the invention.

FIG. 2 is a schematic flow chart of a method for transmitting a preamble sequence on PRACH according to embodiments of the invention, and as illustrated, the method includes the following operations.

The operation 201 is to determine a preamble sub-sequence to be transmitted in the current stage.

The operation 202 is to scramble and then transmit the preamble sub-sequence, where the preamble sub-sequence is scrambled using a cyclic shift value of a preamble sub-sequence transmitted in the previous stage.

In an implementation, upon scrambling according to the cyclic shift value of the preamble sub-sequence transmitted in the previous stage, the cyclic shift value is a preamble sub-sequence index of the preamble sub-sequence transmitted in the previous stage, or is obtained as a result of linear mapping the index.

In an implementation, upon scrambling according to the cyclic shift value of the preamble sub-sequence transmitted in the previous stage, a pseudo-random noise sequence is configured for scrambling.

Some implementations are described below.

A) A preamble sub-sequence in a first stage is designed as follows.

The preamble sub-sequence $P_1(n)$ in the first stage is still a ZC sequence defined in Equation (3) of:

$$P_1(n)=X_{u_1,v_1}(n), (0 \leq n \leq N_{ZC}-1) \qquad (3).$$

$u_1$ and $v_1$ represent a root index and a cyclic shift value of the ZC sequence respectively.

B) A preamble sub-sequence $P_m(n)$ in the m-th ($2 \leq m \leq M$) stage is designed as follows.

The preamble sub-sequence $P_m(n)$ in the m-th ($2 \leq m \leq M$) stage is defined in Equation (4) of:

$$P_m(n)=X_{u_m,v_m}(n)S_m(n), (0 \leq n \leq N_{ZC}-1) \qquad (4).$$

$u_m$ and $v_m$ represent a root index and a cyclic shift value of the ZC sequence $X_{u_m,v_m}(n)$, and the scrambling sequence $S_m(n)$ is defined in Equation (5) of:

$$S_m(n)=S((n+n_m) \bmod (N_s)), (0 \leq n \leq N_{ZC}-1) \qquad (5).$$

$S(n)$ represents the maximum length sequence (m-sequence) with the length of $N_s$, where $N_s=2^K-1$ and $K=\lfloor \log_2 (N_{ZC}+1) \rfloor$.

The cyclic shift value $n_m$ is determined according to a ZC sequence $X_{u_{m-1},v_{m-1}}(n)$ in a preamble sub-sequence in the (m-1)-th stage. For example, $n_m$ is a preamble sub-sequence index of $X_{u_{m-1},v_{m-1}}(n)$ (the index ranges from 0 to N_Pre, where N_Pre represents the size of a set of preamble sub-sequences).

$S(n)$ is alternatively another pseudo-random noise sequence than the m-sequence.

Figure 3:
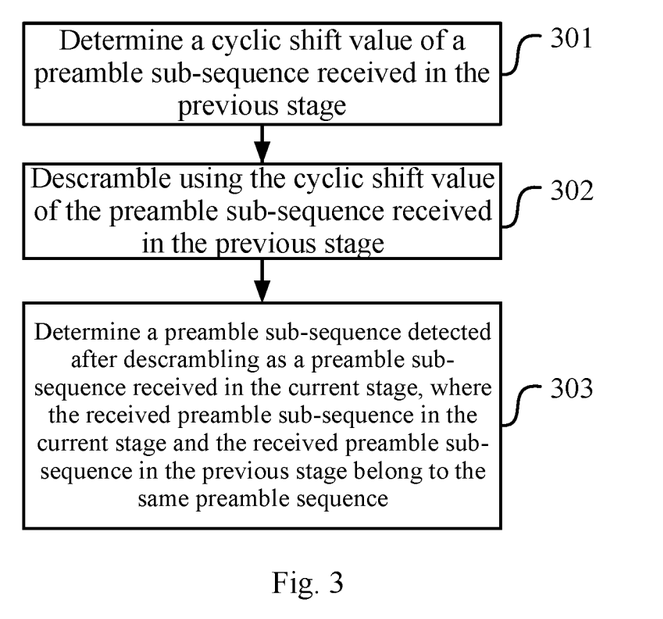
FIG. 3 is a schematic flow chart of a method for receiving a preamble sequence on PRACH according to some embodiments of the invention.

FIG. 3 is a schematic flow chart of a method for receiving a preamble sequence on PRACH according to an embodiment of the invention, and as illustrated, the method includes the following operations.

The operation 301 is to determine a cyclic shift value of a preamble sub-sequence received in the previous stage.

The operation 302 is to descramble using the cyclic shift value of the preamble sub-sequence received in the previous stage.

The operation 303 is to determine a preamble sub-sequence detected after descrambling as a preamble sub-sequence received in a current stage, where the received preamble sub-sequence in the current stage and the received preamble sub-sequence in the previous stage belong to the same preamble sequence.

In an implementation, upon descrambling the preamble sub-sequence in the current stage according to the cyclic shift value of the preamble sub-sequence received in the previous stage, the cyclic shift value is a preamble sub-sequence index of the preamble sub-sequence received in the previous stage, or is obtained as a result of linear mapping the index.

In an implementation, upon descrambling the preamble sub-sequence in the current stage according to the cyclic shift value of the preamble sub-sequence received in the previous stage, a pseudo-random noise sequence is configured for descrambling.

In an implementation, while a network is detecting a preamble sequence, once a receiver successfully detects a preamble sub-sequence $P_m(n)$ in some m-th ($1 \leq m \leq M-1$) stage, the receiver can obtain a cyclic shift value $n_{m+1}$ of a scrambling sequence $S_{m+1}(n)$ of a preamble sub-sequence $P_{m+1}(n)$ in the (m+1)-th stage using $P_m(n)$, and descramble before it detects the preamble sub-sequence $P_{m+1}(n)$ in the (m+1)-th stage.

$P_{m+1}(n)$ detected as a result of descrambling $P_m(n)$ is the preamble sub-sequence in the (m+1)-th stage corresponding to $P_m(n)$ instead of another preamble sub-sequence in m-th stage.

With the design above, such a problem can be avoided in effect that if a plurality of UEs transmit over the same time-frequency resource, an M-stage preamble sequence may not be detected accurately.

An embodiment will be described below.

In this embodiment, a 2-sage preamble sequence is designed to thereby avoid it from being detected inaccurately among a plurality of UEs.

1) At a transmitter.

A preamble sub-sequence 1 $P_1(n)$ in the first stage is still an ZC sequence defined in Equation (6) of:

$$P_1(n)=X_{u_1,v_1}(n), (0 \leq n \leq N_{ZC}-1) \quad (6).$$

$u_1$ and $v_1$ represent a root index and a cyclic shift value of the ZC sequence respectively.

A preamble sub-sequence 2 $P_2(n)$ in the second stage is defined in Equation (7) of:

$$P_2(n)=X_{u_2,v_2}(n)S(n), (0 \leq n \leq N_{ZC}-1) \quad (7).$$

$u_2$ and $v_2$ represent a root index and a cyclic shift value of the ZC sequence respectively, and $S_2(n)$ is defined in Equation (8) of:

$$S_2(n)=S((n+n_2) \bmod(N_s)), (0 \leq n \leq N_{ZC}-1) \quad (8).$$

The cyclic shift value $n_2$ is a cyclic shift value determined according to the 2-stage preamble sub-sequence 1 $P_1(n)$, and for example, $n_2$ represents a preamble sub-sequence index of $P_1(n)$ (the index ranges from 0 to N_Pre, where N_Pre represents the size of a set of preamble sub-sequences).

For example, $N_{ZC}=71$, so $K=\lfloor \log_2(N_{ZC}+1) \rfloor=6$; $N_s=2^6-1=63$, and the scrambling sequence S(n) is defined in Equation (9) of:

$$s(i)=1-2x(i), 0 \leq i \leq 62 \quad (9).$$

x(n) is defined in Equation (10) of:

$$x(i+5)=(x(i+2)+x(i)) \bmod 2, 0 \leq i \leq 57 \quad (10).$$

Initial values are x(0)=0, x(1)=0, x(2)=0, x(3)=0, x(4)=1.

2) At a receiver.

While a network is detecting a preamble sequence, once a base station successfully detects the preamble sub-sequence 1 $P_1(n)$, the base station can obtain the scrambling sequence $S_2(n)$ of the preamble sub-sequence 2 using $P_1(n)$, and descramble before it detects the preamble sub-sequence 2.

With the design above, such a problem can be avoided in effect that the 2-stage preamble sequence may not be detected accurately at the network side when a plurality of UEs transmit over the same time-frequency resource. As described above, for example, two UEs in a system transmit 2-stage preamble sequences over the same time-frequency resource, where the UE 1 selects a 2-stage preamble sequence (a, b), and the UE 2 selects a 2-stage preamble sequence (c, d). After the base station correctly detects the indexes a and c of the first preamble sub-sequence in the stage-1, the base station detects preamble sub-sequences in the stage-2 using a and c respectively. The base station descrambling using the preamble sub-sequence index a detects the corresponding preamble sub-sequence index b in the stage-2; and alike base station descrambling using the preamble sub-sequence index c detects the corresponding preamble sub-sequence index d in the stage-2.

Based upon the same inventive idea, embodiments of the invention further provide a device for transmitting a preamble sequence on PRACH, and a device for receiving a preamble sequence on PRACH, and since these devices address the problem under a similar principle to the method for transmitting a preamble sequence on PRACH, and the method for receiving a preamble sequence on PRACH, reference can be made to the implementations of the methods for implementations of the devices, and a repeated description thereof will be omitted here.

Figure 4:
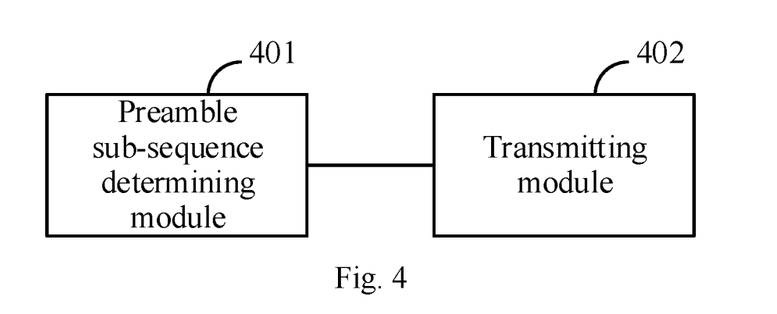
FIG. 4 is a schematic structural diagram of a device for transmitting a preamble sequence on PRACH according to some embodiments of the invention.

FIG. 4 is a schematic structural diagram of a device for transmitting a preamble sequence on PRACH, and as illustrated, the device includes a preamble sub-sequence determining module 401 and a transmitting module 402.

The preamble sub-sequence determining module 401 is configured to determine a preamble sub-sequence to be transmitted in the current stage.

The transmitting module 402 is configured to scramble and then transmit the preamble sub-sequence, where the preamble sub-sequence is scrambled using a cyclic shift of a preamble sub-sequence transmitted in the previous stage.

In an implementation, the transmitting module is further configured to scramble the preamble sub-sequence using the cyclic shift value of the preamble sub-sequence transmitted in the previous stage, where the cyclic shift value is a preamble sub-sequence index of the preamble sub-sequence transmitted in the previous stage, or is obtained as a result of linear mapping the index.

In an implementation, the transmitting module is further configured to scramble the preamble sub-sequence using the cyclic shift value of the preamble sub-sequence transmitted in the previous stage, where a pseudo-random noise sequence is configured for scrambling.

Figure 5:
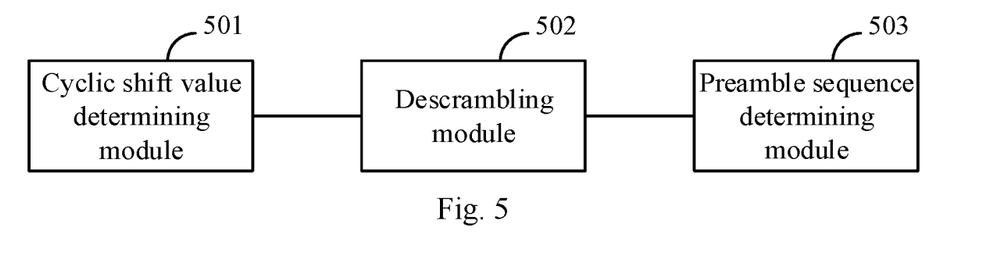
FIG. 5 is a schematic structural diagram of a device for receiving a preamble sequence on PRACH according to some embodiments of the invention.

FIG. 5 is a schematic structural diagram of a device for receiving a preamble sequence on PRACH according to an embodiment of the invention, and as illustrated, the device includes a cyclic shift determining module 501, a descrambling module 502 and a preamble sequence determining module 503. The cyclic shift determining module 501 is configured to determine a cyclic shift of a preamble sub-sequence received in the previous stage.

The descrambling module 502 is configured to descramble using the cyclic shift of the preamble sub-sequence received in the previous stage.

The preamble sequence determining module 503 is configured to determine a preamble sub-sequence detected after descrambling as a preamble sub-sequence received in a current stage, where the received preamble sub-sequence in the current stage and the received preamble sub-sequence in the previous stage belong to the same preamble sequence.

In an implementation, the descrambling module is further configured to descramble using the cyclic shift value of the preamble sub-sequence received in the previous stage, where the cyclic shift value is a preamble sub-sequence index of the preamble sub-sequence received in the previous stage, or the cyclic shift value is a value obtained as a result of linear mapping from the preamble sub-sequence index.

In an implementation, the descrambling module is further configured to descramble using the cyclic shift of the preamble sub-sequence received in the previous stage, where a pseudo-random noise sequence is configured for descrambling.

For the sake of a convenient description, the respective components of the devices above have been described respectively as respective functional modules or units. Of course, the functions of the respective modules or units can be performed in the same one or more pieces of software or hardware in an implementation of the invention.

The technical solutions according to the embodiments of the invention can be implemented as follows.

Figure 6:
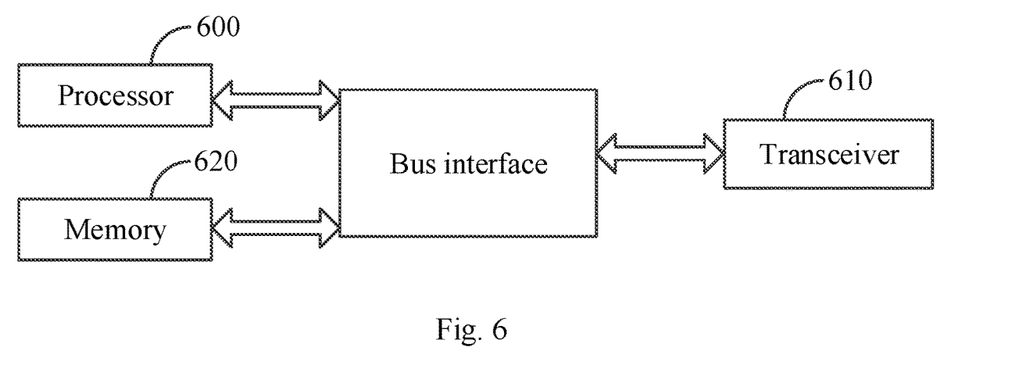
FIG. 6 is a schematic structural diagram of a transmitting device according to some embodiments of the invention.

FIG. 6 is a schematic structural diagram of a transmitter according to an embodiment of the invention, and as illustrated, the device includes a processor 600, a transceiver 610 and a memory 620.

The processor 600 is configured to read and execute program in the memory 620: to determine a preamble sub-sequence to be transmitted in the current stage.

The transceiver 610 is configured to transmit and receive data under the control of the processor 600 to scramble and then transmit the preamble sub-sequence, where the preamble sub-sequence is scrambled according to a cyclic shift value of a preamble sub-sequence transmitted in the previous stage.

In an implementation, upon scrambling the preamble sub-sequence in the current stage according to the cyclic shift value of the preamble sub-sequence transmitted in the previous stage, the cyclic shift value is a preamble sub-sequence index of the preamble sub-sequence transmitted in the previous stage, or is obtained as a result of linear mapping the index.

In an implementation, upon scrambling the preamble sub-sequence in the current stage according to the cyclic shift value of the preamble sub-sequence transmitted in the previous stage, a pseudo-random noise sequence is configured for scrambling.

Here in FIG. 6, the bus architecture can include any number of interconnecting buses and bridges to particularly link together various circuits including one or more processors represented by the processor 600, and one or more memories represented by the memory 620. The bus architecture can further link together various other circuits, e.g., a peripheral device, a manostat, a power management circuit, etc., all of which are well known in the art, so a further description thereof will be omitted in this context. The bus interface serves as an interface. The transceiver 610 can be a number of elements, e.g., a transmitter and a receiver, which are units for communication with various other devices over a transmission medium. The processor 600 is responsible for managing the bus architecture and performing normal processes, and the memory 620 can store data for use by the processor 600 in performing the operations.

Figure 7:
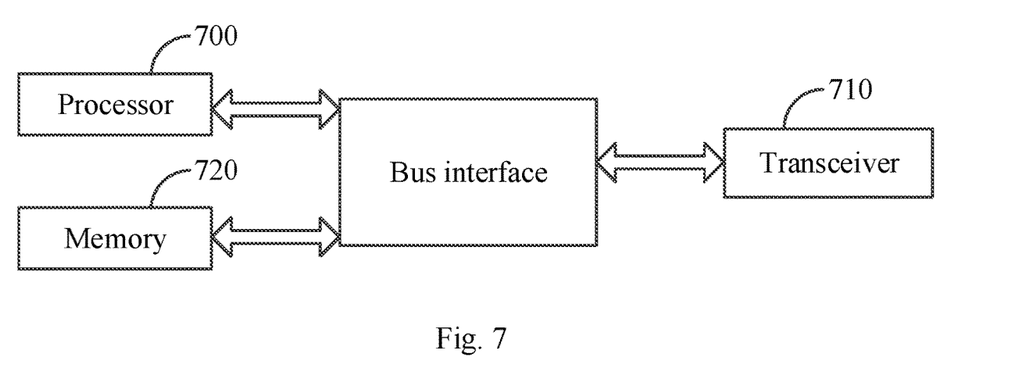
FIG. 7 is a schematic structural diagram of a receiving device according to some embodiments of the invention.

FIG. 7 is a schematic structural diagram of a receiver according to an embodiment of the invention, and as illustrated, the receiver includes a transmitter 700, a transceiver 710 and a memory 720.

The transmitter 700 is configured to read and execute program in the memory 720 to determine a cyclic shift of a preamble sub-sequence received in the previous stage; to descramble using the cyclic shift of the preamble sub-sequence received in the previous stage; and to determine a preamble sub-sequence detected after descrambling as a preamble sub-sequence received in a current stage, where the received preamble sub-sequence in the current stage and the received preamble sub-sequence in the previous stage belong to the same preamble sequence.

The transceiver 710 is configured to transmit and receive data under the control of the processor 700 to receive a preamble sub-sequence on PRACH.

In an implementation, upon descrambling the preamble sub-sequence in the current stage according to the cyclic shift value of the preamble sub-sequence received in the previous stage, the cyclic shift value is a preamble sub-sequence index of the preamble sub-sequence received in the previous stage, or is obtained as a result of linear mapping the index.

In an implementation, upon descrambling the preamble sub-sequence in the current stage according to the cyclic shift value of the preamble sub-sequence received in the previous stage, a pseudo-random noise sequence is configured for descrambling.

Here in FIG. 7, the bus architecture can include any number of interconnecting buses and bridges to particularly link together various circuits including one or more processors represented by the processor 700, and one or more memories represented by the memory 720. The bus architecture can further link together various other circuits, e.g., a peripheral device, a manostat, a power management circuit, etc., all of which are well known in the art, so a further description thereof will be omitted in this context. The bus interface serves as an interface. The transceiver 710 can be a number of elements, e.g., a transmitter and a receiver, which are units for communication with various other devices over a transmission medium. The processor 700 is responsible for managing the bus architecture and performing normal processes, and the memory 720 can store data for use by the processor 700 in performing the operations.

In summary, the technical solutions according to the embodiments of the invention can address the problem in the prior art that if a plurality of UEs transmit over the same time-frequency resource, then a preamble sequence may not be detected accurately in the NR-PRACH M-stage preamble sequence solution, and can guarantee in effect the reliability and performance of the preamble sequence solution.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the embodiments of the invention have been described, those skilled in the art benefiting from the underlying inventive concept can make additional modifications and variations to these embodiments. Therefore the appended claims are intended to be construed as encompassing the embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A method for transmitting a Multi-stage, M-stage, preamble sequence on Physical Random Access Channel (PRACH), wherein the M-stage preamble sequence comprises a number M of preamble sub-sequences, and the method comprises:
    determining a preamble sub-sequence of the M-stage preamble sequence, to be transmitted in a current stage, wherein the preamble sub-sequence is obtained by cyclic-shifting a Zadoff-Chu, ZC, root sequence, and scrambling the cyclic-shifted ZC root sequence with a scrambling sequence; and
    transmitting the preamble sub-sequence;
    wherein the scrambling sequence is obtained by cyclic-shifting a root sequence based on a cyclic shift value, and the cyclic shift value is a preamble sub-sequence index of the cyclic- shifted ZC root sequence that was used to obtain a preamble sub-sequence transmitted in a previous stage;
    wherein the preamble sub-sequence in the current stage is scrambled by a pseudo-random noise sequence.

2. The method according to claim 1, wherein the cyclic shift value is a value obtained as a result of linear mapping from the preamble sub-sequence index of the cyclic-shifted ZC root sequence that was used to obtain the preamble sub-sequence transmitted in the previous stage.

3. A method for receiving a Multi-stage, M-stage, preamble sequence on Physical Random Access Channel (PRACH), wherein the M-stage preamble sequence comprises a number M of preamble sub-sequences, and the method comprises:
    determining a cyclic shift value of a preamble sub-sequence of the M-stage preamble sequence, received in a previous stage;
    descrambling a preamble sub-sequence in a current stage according to the cyclic shift value, wherein the preamble sub-sequence in the current stage is obtained by cyclic-shifting a Zadoff-Chu, ZC, root sequence, and scrambling the cyclic-shifted ZC root sequence with a scrambling sequence, and the cyclic shift value is a preamble sub-sequence index of the cyclic-shifted ZC root sequence that was used to obtain the preamble sub-sequence received in the previous stage; and
    determining a preamble sub-sequence detected after descrambling as a preamble sub-sequence received in the current stage, wherein the received preamble sub-sequence in the current stage and the received preamble sub-sequence in the previous stage belong to the same preamble sequence;
    wherein the preamble sub-sequence in the current stage is descrambled by a pseudo-random noise sequence.

4. The method according to claim 3, wherein the cyclic shift value is a value obtained as a result of linear mapping from the preamble sub-sequence index of the cyclic-shifted ZC root sequence that was used to obtain the preamble sub-sequence transmitted in the previous stage.

5. A device for transmitting a Multi-stage, M-stage, preamble sequence on Physical Random Access Channel (PRACH), wherein the M-stage preamble sequence comprises a number M of preamble sub-sequences, and the device comprises a processor and a transceiver, wherein:
    the processor is configured to read and execute program in a memory to perform the method according to claim 1.

6. The device according to claim 5, wherein the cyclic shift value is a value obtained as a result of linear mapping from the preamble sub-sequence index of the cyclic-shifted ZC root sequence that was used to obtain the preamble sub-sequence transmitted in the previous stage.

7. A device for receiving a Multi-stage, M-stage, preamble sequence on Physical Random Access Channel (PRACH), wherein the M-stage preamble sequence comprises a number M of preamble sub-sequences, and the device comprises a processor and a transceiver, wherein:
    the processor is configured to read and execute program in a memory:
    to determine a cyclic shift value of a preamble sub-sequence of the M-stage preamble sequence, received in a previous stage;
    to descramble a preamble sub-sequence in a current stage according to the cyclic shift value, wherein the preamble sub-sequence in the current stage is obtained by cyclic-shifting a Zadoff-Chu, ZC, root sequence, and scrambling the cyclic-shifted ZC root sequence with a scrambling sequence, and the cyclic shift value is a preamble sub-sequence index of the cyclic-shifted ZC root sequence that was used to obtain the preamble sub-sequence received in the previous stage; and
    to determine a preamble sub-sequence detected after descrambling as a preamble sub-sequence received in the current stage, wherein the received preamble subsequence in the current stage and the received preamble sub-sequence in the previous stage belong to the same preamble sequence; and the transceiver is configured to transmit and receive data under the control of the processor:

to receive a preamble sub-sequence on PRACH;

wherein the preamble sub-sequence in the current stage is descrambled by a pseudo-random noise sequence.

8. The device according to claim 7, wherein the cyclic shift value is a value obtained as a result of linear mapping from the preamble sub-sequence index of the cyclic-shifted ZC root sequence that was used to obtain the preamble sub-sequence transmitted in the previous stage.

* * * * *